US006397242B1

(12) United States Patent
Devine et al.

(10) Patent No.: US 6,397,242 B1
(45) Date of Patent: May 28, 2002

(54) VIRTUALIZATION SYSTEM INCLUDING A VIRTUAL MACHINE MONITOR FOR A COMPUTER WITH A SEGMENTED ARCHITECTURE

(75) Inventors: Scott W. Devine, Palo Alto; Edouard Bugnion, Menlo Park; Mendel Rosenblum, Stanford, all of CA (US)

(73) Assignee: VMWare, Inc., Palo Alto, CA (US)

( * ) Notice: Subject to any disclaimer, the term of this patent is extended or adjusted under 35 U.S.C. 154(b) by 0 days.

(21) Appl. No.: 09/179,137

(22) Filed: Oct. 26, 1998

Related U.S. Application Data

(60) Provisional application No. 60/085,685, filed on May 15, 1998.

(51) Int. Cl.[7] .................................................. G06F 9/00
(52) U.S. Cl. ........................ 709/1; 709/214; 709/321; 703/27; 710/23; 711/148; 711/153
(58) Field of Search .......................... 709/100, 1, 200, 709/224, 316, 320, 328, 330, 223; 717/131, 138, 140; 703/26, 27; 714/1, 2, 47

(56) References Cited

U.S. PATENT DOCUMENTS

| | | |
|---|---|---|
| 4,747,040 A | 5/1988 | Blanset et al. |
| 4,787,031 A | 11/1988 | Karger et al. |
| 4,792,895 A | 12/1988 | Tallman |
| 4,926,322 A | 5/1990 | Stimac et al. |
| 4,974,159 A | 11/1990 | Hargrove et al. |
| 5,134,580 A | 7/1992 | Bertram et al. |
| 5,167,023 A | 11/1992 | de Nicolas et al. |
| 5,255,379 A | 10/1993 | Melo |
| 5,307,504 A | 4/1994 | Robinson et al. |
| 5,440,710 A | 8/1995 | Richter et al. |
| 5,488,716 A | 1/1996 | Schneider et al. |
| 5,522,075 A | 5/1996 | Robinson et al. |
| 5,560,013 A * | 9/1996 | Scalzi et al. ............ 717/138 |
| 5,652,869 A | 7/1997 | Herdeg et al. |
| 5,652,872 A | 7/1997 | Richter et al. |
| 5,721,922 A | 2/1998 | Dingwall |
| 5,761,477 A * | 6/1998 | Wahbe et al. .............. 709/1 |
| 5,832,205 A | 11/1998 | Kelly et al. |

OTHER PUBLICATIONS

Goldberg, "Survey of Virtual Machine Research," Computer, Jun. 1974, pp. 34–45.
Ebciglu et al., "IBM Research Report—Daisy: Dynamic Compilation for 100% Architectural Compatibility", RC 20538, Aug. 5, 1996.
Bugnion, "Disco: Running Commodity Operating Systems on Scalable Multiprocessors," ACM Trans. on Computer Systems, vol. 15, No. 4, Nov. 1997, pp. 412–447.
Bressoud, "Hypervisor–based Fault–tolerance," SIGOPS '95, Dec. 1995, pp. 1–11.
Rosenblum et al., "Using the SimOS Machine Simulator to Study Complex Computer Systems," ACM Trans. on Modeling and Computer Simulation, vol 7, No. 1, Jan. 1997, pp. 78–103.
Creasy, "The Origin of the VM/370 Time–Sharing System," IBM J. Res. Develop., vol. 25, No. 5, Sep. 1981.
Intel Architecture Software Developer's Manual, vol. 3, 1997.

* cited by examiner

*Primary Examiner*—Majid Banankhah
(74) *Attorney, Agent, or Firm*—Jeffrey Slusher

(57) ABSTRACT

In a computer that has hardware processor, and a memory, the invention provides a virtual machine monitor (VMM) and a virtual machine (VM) that has at least one virtual processor and is operatively connected to the VMM for running a sequence of VM instructions, which are either directly executable or non-directly executable. The VMM includes both a binary translation sub-system and a direct execution sub-system, as well as a sub-system that determines if VM instructions must be executed using binary translation, or if they can be executed using direct execution. Shadow descriptor tables in the VMM, corresponding to VM descriptor tables, segment tracking and memory tracing are used as factors in the decision of which execution mode to activate. The invention is particularly well-adapted for virtualizing computers in which the hardware processor has an Intel x86 architecture.

28 Claims, 6 Drawing Sheets

VIRTUALIZATION SYSTEM INCLUDING A VIRTUAL MACHINE MONITOR FOR A COMPUTER WITH A SEGMENTED ARCHITECTURE

CROSS-REFERENCE TO RELATED APPLICATIONS

This application claims priority from U.S. Provisional Patent Application No. 60/085,685, "Virtual Machine Monitor", filed May 15, 1998.

BACKGROUND OF THE INVENTION

1. Field of the Invention

This invention relates to a computer architecture, including a virtual machine monitor, and a related operating method that allow virtualization of the resources of a modern computer system.

2. Description of the Related Art

The operating system plays a special role in today's personal computers and engineering work stations. Indeed, it is the only piece of software that is typically ordered at the same time the hardware itself is purchased. Of course, the customer can later change operating systems, upgrade to a newer version of the operating system, or even re-partition the hard drive to support multiple boots. In all cases, however, a single operating system runs at any given time on the computer. As a result, applications written for different operating systems cannot run concurrently on the system.

Various solutions have been proposed to solve this problem and eliminate this restriction. These include virtual machine monitors, machine simulators, application emulators, operating system emulators, embedded operating systems, legacy virtual machine monitors, and boot managers.

Virtual Machine Monitors

One solution that was the subject of intense research in the late 1960's and 1970's came to be known as the "virtual machine monitor" (VMM). See, for example, R. P. Goldberg, "Survey of virtual machine research," IEEE Computer, Vol. 7, No. 6, 1974. During that time, moreover, IBM Corp. adopted a virtual machine monitor for use in its VM/370 system.

A virtual machine monitor is a thin piece of software that runs directly on top of the hardware and virtualizes all the resources of the machine. Since the exported interface is the same as the hardware interface of the machine, the operating system cannot determine the presence of the VMM. Consequently, when the hardware interface is compatible with the underlying hardware, the same operating system can run either on top of the virtual machine monitor or on top of the raw hardware.

Virtual machine monitors were popular at a time where hardware was scarce and operating systems were primitive. By virtualizing all the resources of the system, multiple independent operating systems could coexist on the same machine. For example, each user could have her own virtual machine running a single-user operating system.

The research in virtual machine monitors also led to the design of processor architectures that were particularly suitable for virtualization. It allowed virtual machine monitors to use a technique known as "direct execution," which simplifies the implementation of the monitor and improves performance. With direct execution, the VMM sets up the processor in a mode with reduced privileges so that the operating system cannot directly execute its privileged instructions. The execution with reduced privileges generates traps, for example when the operating system attempts to issue a privileged instruction. The VMM thus needs only to correctly emulate the traps to allow the correct execution of the operating system in the virtual machine.

As hardware became cheaper and operating systems more sophisticated, VMM's based on direct execution began to lose their appeal. Recently, however, they have been proposed to solve specific problems. For example, the Hypervisor system provides fault-tolerance, as is described by T. C. Bressoud and F. B. Schneider, in "Hypervisor-based fault tolerance," ACM Transactions on Computer Systems (TOCS),Vol. 14. (1), February 1996; and in U.S. Pat. No. 5,488,716 "Fault tolerant computer system with shadow virtual processor," (Schneider, et al.). As another example, the Disco system runs commodity operating systems on scalable multiprocessors. See "Disco: Running Commodity Operating Systems on Scalable Multiprocessors," E. Bugnion, S. Devine, K. Govil and M. Rosenblum, ACM Transactions on Computer Systems (TOCS), Vol. 15, No. 4, November 1997, pp. 412–447.

Virtual machine monitors can also provide architectural compatibility between different processor architectures by using a technique known as either "binary emulation" or "binary translation." In these systems, the VMM cannot use direct execution since the virtual and underlying architectures mismatch; rather, they must emulate the virtual architecture on top of the underlying one. This allows entire virtual machines (operating systems and applications) written for a particular processor architecture to run on top of one another. For example, the IBM DAISY system has recently been proposed to run PowerPC and x86 systems on top of a VLIW architecture. See, for example, K. Ebcioglu and E. R. Altman, "DAISY: Compilation for 100% Architectural Compatibility," Proceedings of the 24th International Symposium on Computer Architecture, 1997.

Machine Simulators/Emulators

Machine simulators, also known as machine emulators, run as application programs on top of an existing operating system. They emulate all the components of a given computer system with enough accuracy to run an operating system and its applications. Machine simulators are often used in research to study the performance of multiprocessors. See, for example, M. Rosenblum, et al., "Using the SimOS machine simulator to study complex computer systems," ACM Transactions on Modeling and Computer Simulation, Vol. 7, No. 1, January 1997. They have also been used to simulate an Intel x86 machine as the "VirtualPC" or "RealPC" products on a PowerPC-based Apple Macintosh system.

Machine simulators share binary emulation techniques with some VMM's such as DAISY. They differentiate themselves from VMM's, however, in that they run on top of a host operating system. This has a number of advantages as they can use the services provided by the operating system. On the other hand, these systems can also be somewhat constrained by the host operating system. For example, an operating system that provides protection never allows application programs to issue privileged instructions or to change its address space directly. These constraints typically lead to significant overheads, especially when running on top of operating systems that are protected from applications.

Application Emulators

Like machine simulators, application emulators also run as an application program in order to provide compatibility across different processor architectures. Unlike machine simulators, however, they emulate application-level software and convert the application's system calls into direct calls into the host operating system. These systems have been used in research for architectural studies, as well as to run legacy binaries written for the 68000 architecture on newer PowerPC-based Macintosh systems. They have also been also been used to run x86 applications written for Microsoft NT on Alpha work stations running Microsoft NT. In all cases, the expected operating system matches the underlying one, which simplifies the implementation. Other systems such as the known Insigna's SoftWindows use binary emulation to run Windows applications and a modified version of the Windows operating system on platforms other than PCS. At least two known systems allow Macintosh applications to run on other systems: the Executer runs them on Intel processors running Linux or Next and MAE runs them on top of the Unix operating system.

Operating System Emulators

Operating system (OS) emulators allow applications written for one given operating system application binary interface (ABI) to run on another operating system. They translate all system calls made by the application for the original operating system into a sequence of system calls to the underlying operating system. ABI emulators are currently used to allow Unix applications to run on Window NT (the Softway OpenNT emulator) and to run applications written for Microsoft's operating systems on public-domain operating systems (the Linux WINE project).

Unlike virtual machine monitors and machine simulators, which are essentially independent of the operating system, ABI emulators are intimately tied with the operating system that they are emulating. Operating system emulators differ from application emulators in that the applications are already compiled for the instruction set architecture of the target processor. The OS emulator does not need to worry about the execution of the applications, but rather only of the calls that it makes to the underlying operating system.

Embedded Operating Systems

Emulating an ABI at the user level is not an option if the goal is to provide additional guarantees to the applications that are not provided by the host operating system. For example, the VenturCom RTX Real-Time subsystem embeds a real-time kernel within the Microsoft NT operating system. This effectively allows real-time processes to co-exist with traditional NT processes within the same system.

This co-existence requires the modification of the lowest levels of the operating system, that is, its Hardware Abstraction Layer (HAL). This allows the RTX system to first handle all I/O interrupts. This solution is tightly coupled with WindowsNT, since both environments share the same address space and interrupts entry points.

Legacy Virtual Machine Monitors

Certain processors, most notably those with the Intel architecture, contain special execution modes that are specifically designed to virtualize a given legacy architecture. This mode is designed to support the strict virtualization of the legacy architecture, but not of the existing architecture.

A legacy virtual machine monitor consists of the appropriate software support that allows running the legacy operating system using the special mode of the processor. Specifically, Microsoft's DOS virtual machine runs DOS in a virtual machine on top of Microsoft Windows and NT. As another example, the freeware DOSEMU system runs DOS on top of Linux.

Although these systems are commonly referred to as a form of virtual machine monitor, they run either on top of an existing operating system, such as DOSEMU, or as part of an existing operating system such as Microsoft Windows and Microsoft NT. In this respect, they are quite different from the true virtual machine monitors described above, and from the definition of the term "virtual machine monitor" applied to the invention described below.

Boot Managers

Finally, boot managers such as the public-domain LILO and the commercial System Commander facilitate changing operating systems by managing multiple partitions on the hard drive. The user must, however, reboot the computer to change perating systems. Boot managers therefore do not allow applications written for different operating systems to coexist. Rather, they simply allow the user to reboot another operating system without having to reinstall it, that is, without having to remove the previous operating system.

General Shortcomings of the Prior Art

All of the systems described above are designed to allow applications designed for one version or type of operating system to run on systems with a different version or type of operating system. As usual, the designer of such a system must try to meet different requirements, which are often competing, and sometimes apparently mutually exclusive.

Virtual machine monitors (VMM) have many attractive properties. For example, conventional VMMs outperform machine emulators since they run at system level without the overhead and constraint of an existing operating system. They are, moreover, more general than application and operating system emulators since they can run any application and any operating system written for the virtual machine architecture. Furthermore, they allow modern operating systems to coexist, not just the legacy operating systems that legacy virtual machine monitors allow. Finally, they allow application written for different operating systems to time-share the processor; in this respect they differ from boot managers, which require a complete "re-boot," that is, system restart, between applications.

As is the typical case in the engineering world, the attractive properties of VMMs come with corresponding drawbacks. A major drawback is the lack of portability of the VMM itself—conventional VMMs are intimately tied to the hardware that they run on, and to the hardware they emulate. Also, the virtualization of all the resources of the system generally leads to diminished performance.

As is mentioned above, certain architectures (so-called "strictly virtualizeable" architectures), allow VMMs to use a technique known as "direct execution" to run the virtual machines. This technique maximizes performance by letting the virtual machine run directly on the hardware in all cases where it is safe to do so. Specifically, it runs the operating system in the virtual machine with reduced privileges so that the effect of any instruction sequence is guaranteed to be contained in the virtual machine. Because of this, the VMM must handle only the traps that result from attempts by the virtual machine to issue privileged instructions.

Unfortunately, many current architectures are not strictly virtualizeable. This may be because either their instructions are non-virtualizeable, or they have segmented architectures that are non-virtualizeable, or both. Unfortunately, the all-but-ubiquitous Intel x86 processor family has both of these problematic properties, that is, both non-virtualizeable instructions and non-reversible segmentation. Consequently, no VMM based exclusively on direct execution can completely virtualize the x86 architecture.

Complete virtualization of even the Intel x86 architecture using binary translation is of course possible, but the loss of performance would be significant. Note that, unlike cross-architectural systems such as DAISY, in which the processor contains specific support for emulation, the Intel x86 was not designed to run a binary translator. Consequently, no conventional x86-based system has been able to successfully virtualize the Intel x86 processor itself.

What is needed is therefore a VMM that is able to function with both the speed of a direct-execution system and the flexibility of a binary-translation system. The VMM should also have an efficient switch between the two execution modes. This invention provides such a system.

SUMMARY OF THE INVENTION

The invention provides a system for virtualizing a computer. The invention comprises a hardware processor; a memory; a virtual machine monitor (VMM); and a virtual machine (VM). The VM has at least one virtual processor and is operatively connected to the VMM for running a sequence of VM instructions. The VM instruction include directly executable VM instructions and non-directly executable instructions.

The VMM according to the invention includes: a binary translation sub-system; a direct execution sub-system; and an execution decision module/sub-system that implements a decision function for discriminating between the directly executable and non-directly executable VM instructions, and for selectively directing the VMM to activate the direct execution subsystem for execution by the hardware processor of the directly executable VM instructions and to activate the binary translation subsystem for execution on the hardware processor of the non-directly executable VM instructions.

In a preferred embodiment of the invention, the hardware processor has a plurality of privilege levels, as well as virtualizeable instructions and non-virtualizeable instructions. The non-virtualizeable instructions have predefined semantics that depend on the privilege level, and the semantics of at least two of the privilege levels are mutually different and non-trapping. In this embodiment, the VM has a privileged operation mode and a non-privileged operation mode and the decision sub-system is further provided for directing the VMM to activate the binary translation sub-system when the VM is in the privileged operation mode.

According to another aspect of the invention, the hardware processor has a plurality of hardware segments and at least one hardware segment descriptor table that is stored in the memory and that has, as entries, hardware segment descriptors. The VM has VM descriptor tables that in turn have, as entries, VM segment descriptors. Furthermore, the virtual processor has virtual segments. In this preferred embodiment, the VMM includes VMM descriptor tables, including shadow descriptors, that correspond to predetermined ones of the VM descriptors tables. The VMM also includes a segment tracking sub-system/module that compares the shadow descriptors with their corresponding VM segment descriptors, and indicates any lack of correspondence between shadow descriptor tables with their corresponding VM descriptor tables, and updates the shadow descriptors so that they correspond to their respective corresponding VM segment descriptors.

The VMM in the preferred embodiment of the invention additionally includes one cached entry in the VMM descriptor tables for each segment of the processor, the binary translation sub-system selectively accessing each cached entry instead of the corresponding shadow entry. Furthermore, the hardware processor includes a detection sub-system that detects attempts by the VM to load VMM descriptors other than shadow descriptors, and updates the VMM descriptor table so that the cached entry corresponding to the processor segment also corresponds to the VM segment descriptor. The VMM thereby also uses binary translation using this cached entry until the processor segment is subsequently loaded with a VMM descriptor that is a shadow descriptor.

In another aspect of the invention, the hardware processor has predetermined caching semantics and includes non-reversible state information. The segment tracking sub-system is further provided for detecting attempts by the VM to modify any VM segment descriptor that leads to a non-reversible processor segment. The VMM then also updates the VMM descriptor table so that the cached entry corresponding to the processor segment also corresponds to the VM segment descriptor, before any modification of the VM segment descriptor. The decision sub-system is further provided for directing the VMM to activate the binary translation sub-system when the segment-tracking sub-system has detected creation of a non-reversible segment, and the binary translation sub-system uses the cached entry until the processor segment is subsequently loaded with a VMM descriptor that is a shadow descriptor.

According to yet another aspect of the invention, the hardware processor has a native mode; and the virtual processor in the VM has native and non-native execution modes, in which the non-native execution modes are independent of the VM segment descriptor tables for accessing segments. The decision sub-system is then further provided for directing the VMM to operate using the cached descriptors and to activate the binary translation sub-system when the hardware processor is in the non-native execution mode. The binary translation sub-system thereby uses the cached entry in the native mode when at least one of the following conditions is present: the virtual processor is in one of the non-native execution modes; and at least one virtual processor segment has been most recently loaded in one of the non-native execution modes.

According to still another aspect of the invention, the hardware processor and the virtual processor each has native and non-native execution modes, in which at least one of the non-native execution modes is strictly virtualizeable. The decision sub-system then directs the VMM to run in the same execution mode as the virtual processor.

In implementations of the invention in which the hardware processor has a memory management unit (MMU), the invention further comprises a memory tracing mechanism, included in the VMM, for detecting, via the MMU, accesses to selectable memory portions. The segment tracking sub-system is then operatively connected to the memory tracing mechanism for detecting accesses to selected memory portions.

The invention is particularly well-suited for virtualizing computer systems in which the hardware processor has an Intel x86 architecture that is compatible with at least the Intel 80386 processor. Where the hardware processor has an Intel x86 architecture with at least one non-virtualizeable instruction, and the virtual processor in the VM also has the Intel x86 architecture, the virtual processor has a plurality of processing states at a plurality of current privilege levels (CPL), an input/output privilege level, and means for disabling interrupts. In such a system, the decision sub-system is further provided for directing the VMM to activate the binary translation sub-system whenever at least one of the following conditions occur: a) the CPL of the virtual processor is set to a most privileged level; b) the inpuvoutput privilege level of the virtual processor is greater than zero;

and c) interrupts are disabled in the virtual processor. The VMM, by means of the binary translation sub-system, thereby virtualizes all non-virtualizeable instructions of the virtual processor as a predetermined function of the processing state of the virtual processor.

In the preferred embodiment of the invention, the hardware processor has an Intel x86 architecture with a protected operation mode, a real operation mode, and a system management operation mode. The VMM then operates within the protected operation mode and uses binary translation to execute VM instructions whenever the real and system management operation modes of the processor are to be virtualized. On the other hand, where the hardware processor has an Intel x86 architecture with a strictly virtualizeable virtual 8086 mode, the VMM uses direct execution whenever the virtual 8086 mode of the processor is to be virtualized.

The invention can also be used for virtualizing systems in which the computer has a plurality of hardware processors. In such cases, the invention further comprises a plurality of virtual processors included in the virtual machine; and, in the VMM, VMM descriptor tables for each virtual processor. The segment tracking sub-system then includes means for indicating to the VMM, on selected ones of the plurality of hardware processors, any lack of correspondence between the shadow descriptor tables and their corresponding VM descriptor tables. Additionally, for each hardware processor on which the VMM is running, the decision sub-system discriminates between the directly executable and the non-directly executable VM instructions independent of the remaining hardware processors.

DETAILED DESCRIPTION

Figure 1:
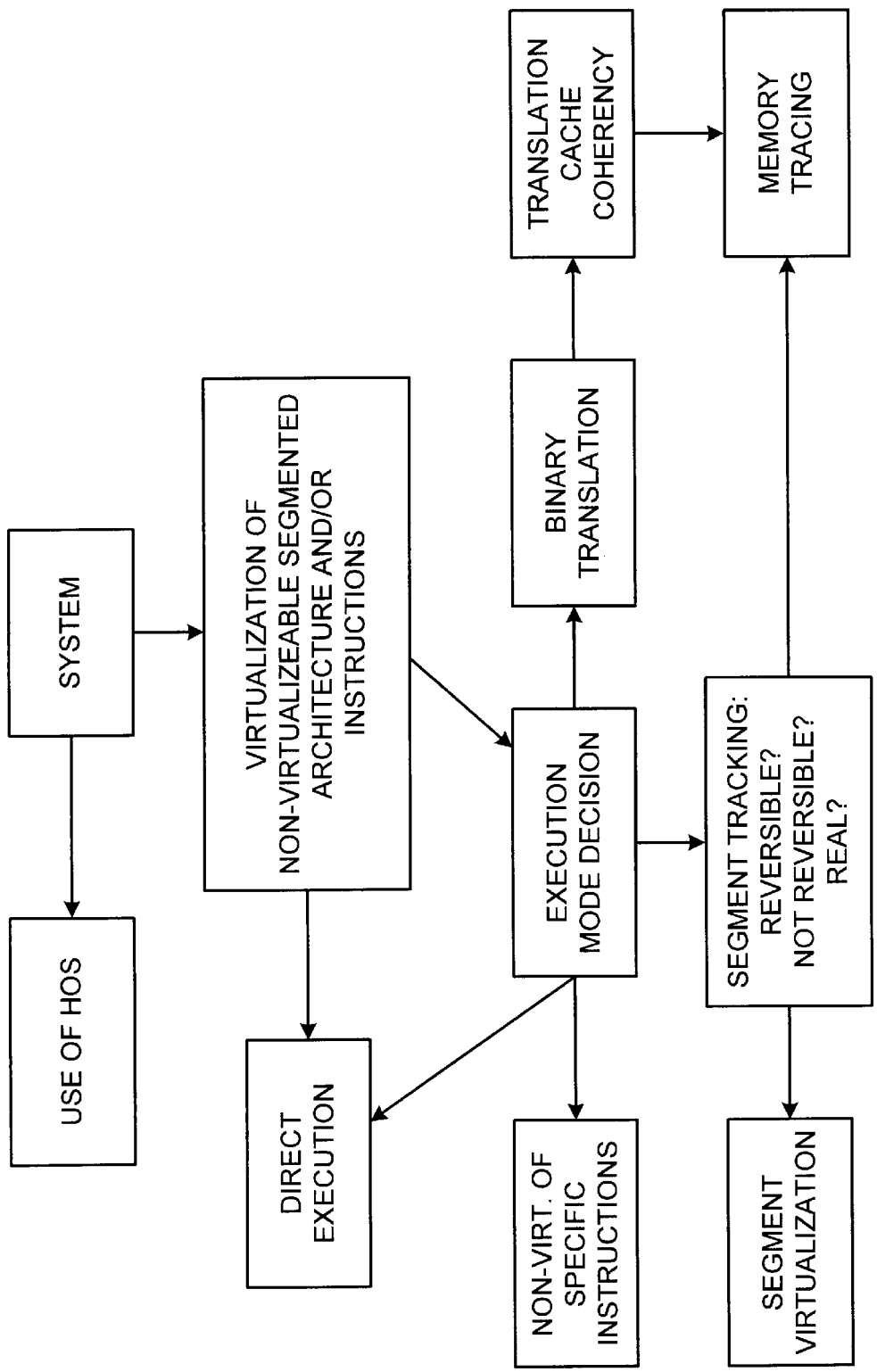
FIG. 1 is a conceptual flow chart of the main ideas and features used in the invention, which also forms a "road map" of the subsequent description of the invention.

The invention is described below in sections for the sake of clarity. First, certain key concepts and terms are explained. Second, a "road map" of the major features and concepts of the invention is discussed. Third, particular features of the virtual machine monitor (VMM) according to the invention that enable dual execution mode operation are described.

In connection with the description of the preferred VMM, the structure of a preferred binary translation execution engine is described. Note that binary translation is a technique that allows the efficient emulation of binary instruction sequences. In the discussion of the invention below, binary translation is referred to instead of binary emulation since this is the correct term for the technique used in the preferred embodiment of the invention.

Fourth, a system that has an existing operating system and that includes the VMM according to the invention is described. Finally, a system in which the invention directly controls hardware devices with no assistance from a host operating system is illustrated and described.

Architectural Concepts and Issues

Before attempting to understand how the invention uniquely solves various problems allowing it to virtualize hitherto non-virtualizeable computer systems, it is helpful to understand just what these problems are. Because the Intel x86 architecture is so widespread, it is the best (but not only) example of the applicability of the invention.

Non-virtualizeable instructions

Certain architectures contain non-virtualizeable instructions, that is, instructions that behave differently depending on the privilege level of the processor, but that trap in neither case. If a virtual machine monitor (VMM) were to use direct execution, for example, it would run a virtual operating system with reduced privileges (at a different privilege level), which would lead to a different result, most likely one that the operating system does not expect at all.

To better understand this potential problem, consider the common Intel x86 architecture. In Intel x86-based systems, there are four privilege levels: CPL0, CPL1, CPL2 and CPL3. CPL0 corresponds to the system level and CPL3 corresponds to the user level. (The other two levels are irrelevant to this discussion.) The Intel x86 system contains a register in which the current privilege level is set. This privilege register can be changed only by protected mechanisms, either instructions or exceptions.

Now, in Intel x86 systems, the "IRET" instruction increments the stack pointer by three words when the instructions do not change the privilege level, but by five words when it does change the privilege level. Another example is the "PUSHF" instruction, which saves a set of flags on the stack. One of these flags, namely, the IF flag, determines whether interrupts are enabled or not. When running a virtual machine on the VMM, the VMM cannot allow the virtual machine to effectively disable the machine's interrupts, since this might cause an irrecoverable loss of control, for example if the virtual machine were to go into an infinite loop. The virtual operating system might, however, want to disable the interrupt, but would then "realize" through a PUSHF instruction that the interrupts have not really been disabled.

Segmented Architectures and Segment Reversibility

Segmented architectures are those in which the processor contains segment registers that are used to help manage and provide protection to its address space. These segments are typically loaded into the processor from a portion of memory called the descriptor table(s). Certain segmented architectures define a precise semantic in the case where the processor first loads a given segment and then later modifies the contents of the corresponding descriptor in memory. In certain architectures, the state of the segment loaded in the processor may be non-reversible, that it, it cannot be reconstructed once the contents in memory have been modified. As is explained below, this feature of the processor leads to a significant complication when it comes to virtualizing the processor.

Once again, the Intel x86 serves as an example, indeed, a particularly complicated example—not only does the Intel x86 system have a segmented architecture, but also, at any given time, but the Intel x86 architecture also supports four modes of operation. The "protected" mode is the native mode of the processor. It is the preferred mode of operation, and the one used by modern operating systems on this architecture. Protected mode is a segment architecture with four levels of execution. "Real" mode was the only operating mode of the Intel 8086 processor and is maintained in more modern systems in order to maintain compatibility with this earlier processor. "System management" mode was introduced with the Intel 80386 processor used for power management and OEM differentiation. It resembles real mode in its method of operation. Finally, "virtual-8086" (v-8086) mode was introduced with the Intel 80386 to run legacy 8086 programs in a legacy virtual machine monitor running on top of an operating system running in protected mode. On an Intel x86 or an x86-compatible platform, the invention should therefore preferably virtualize all four modes of execution for the virtualization to be complete.

Practical Virtualization

Apart from non-virtualizeable instructions, which have a different semantic depending on the privilege level, the Intel x86 architecture additionally contains a set of instructions classified by Intel as "available to applications, but useless to applications." These instructions all read some privilege state of the processor. In the context of this invention, the concept "practical virtualization" of the Intel x86 architecture is to be understood follows: No code sequence executed in the virtual machine may corrupt the entire system, but instruction sequences of applications that rely on the "useless but available" instructions are not guaranteed correct execution. Note that it is exceptionally rare that any application includes any of these instructions.

Conceptual Overview of the Invention

FIG. 1 is a "road map" of the following discussion and of the invention itself. At the highest level there is of course the computer system that is to incorporate the invention. In most modern computer systems that would incorporate the invention, there is an existing or "host" operating system HOS. The invention can be used both together with a HOS and in systems that have no installed operating system.

Many modern computer systems have either a segmented architecture, or nonvirtualizeable instructions, or both. This invention can operate successfully in either case, or both. One aspect of accomplishing this versatility is that the invention decides whether direct execution can be used (to gain the greatest performance), or whether binary translation must be used (to gain greater flexibility and portability or because binary translation is necessary to being able to virtualize the instruction sequence at all). If direct execution cannot be used, then certain specific non-virtualizeable (that is, according to the standard definition) instructions must be properly handled.

The decision to use binary translation leads to other potential concerns. These concerns include maintaining translation cache (TC) coherency. In order to ensure such TC coherency, the preferred embodiment of the invention uses a memory tracing mechanism. Moreover, in order to deal with the particular problems inherent in computer systems with a segmented architecture, the invention determines whether writes made to the virtual machine's memory can lead to non-reversible segments.

The invention employs a segment tracking mechanism to deal with the issue of reversibility. It preferably also uses the same memory tracing mechanism it uses to help ensure TC coherency. Moreover, the Intel x86 architecture contains, in addition to its protected, fundamental or "native" mode, a non-native mode of operation such as "real mode," "virtual 8086 (v-8086) mode," and "system management mode." In these non-native modes, the Intel x86 does not load segments from memory. The invention includes a virtualization mechanism for the processor even in this case.

These concepts, and the way in which the invention addresses the related problems, are discussed below.

Structure of the VMM According to the Invention

Figure 2:
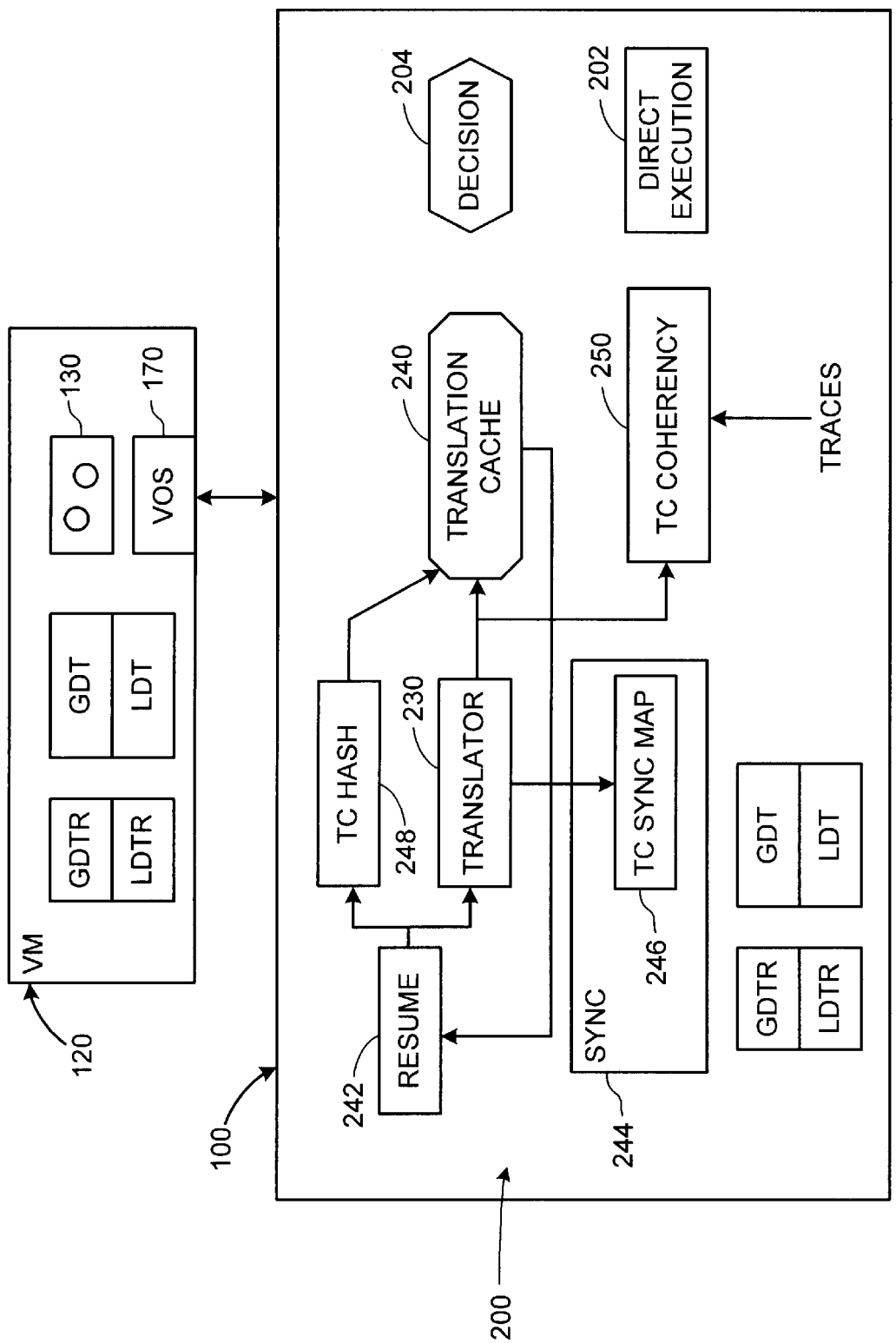
FIG. 2 is a block diagram that shows the various main sub-systems included in the VMM used in the invention, especially, the structure of a preferred binary translation execution engine.

See FIG. 2. There are three main portions of the VMM 100 according to the invention: a binary translation execution engine 200, a direct execution execution engine 202, and a decision sub-system 204 that determines which execution mode to use. FIG. 2 also show a virtual machine 120, which includes a virtual operating system (VOS) 170 and is installed to run on the given hardware platform via the VMM 100.

The concepts and general techniques of binary translation and direct execution are well known in the art. Unique to the invention, however, is that the VMM 100 according to the invention incorporates both execution modes, as well as a decision sub-system that selects between the two. According to the invention, the most complicated sub-system, in the sense that most of the inventive features are included in it, is the binary translation execution engine. The direct execution engine is therefore discussed first to allow for concentration on the binary translation sub-system and its method of operation.

Additionally, this invention describes the first virtual machine monitor for the Intel x86 architecture that uses direct execution at least part of the time. This in itself is an improvement over the state of the art.

Direct Execution Sub-System

There are several known direct-execution execution engines. Any known design may be used in the invention as execution engine 202. For example, prior systems such as VM/370, DISCO, and Hypervisor are based exclusively on direct-execution techniques. This invention is independent of the choice of the direct execution engine. Unique to the invention, however, is that it includes both types of execution engines: binary translation as well as direct execution, as well as a mechanism for switching between the two, to virtualize a computer system that has a segmented architecture.

Direct execution is a technique that allows the virtual machine monitor (VMM) to let the virtual machine directly execute its instruction sequences on the underlying hardware processor. However, the VMM sets up the processor with reduced privileges so that the effect of these instructions is guaranteed to be contained to the virtual machine. For example, the VMM can never allow the processor to be effectively set at the lowest (most) privileged level, even when the operating system in the virtual machine requests it.

Instruction set architectures with non-virtualizeable instructions, that is, instructions that behave differently depending on the state of the processor, cannot lead to the design of virtual machine monitors based exclusively on direct execution. However, direct execution may be used to execute the virtual machine whenever privileges need not be reduced, for example, when the virtual machine is executing unprivileged application programs.

This observation leads to one element of this invention. Indeed, the use of direct execution to virtualize an Intel x86 architecture also leads to substantial performance improvements over systems that rely exclusively on binary translation since it allows the direct use of all the hardware components. On the other hand, dynamic binary translators such as the ones used in existing virtual machine monitors and machine simulators suffer from substantial overhead, even when they can directly use substantial portions of the memory management unit and the segments. For example, the direct use of the underlying hardware leads to significant speed improvements over machine simulators such as Shade and SimOS. Second, the system according to the invention runs advantageously on commodity Intel-x86 compatible processors, unlike DAISY where the processor and binary translator were specifically designed with a common goal in mind. Third, the system according to the preferred embodiment of the invention uses the hardware features of the x86 architecture itself to efficiently emulate other x86 codes.

Memory Tracing

Memory tracing is the ability of the VMM to set read-traces or write-traces, or both, on any given physical page of the virtual machine and to be notified of all read and/or write accesses made to that page in a transparent manner. This includes not only the accesses made by the virtual machine running either in binary translation or direct execution mode, but also the accesses made by the VMM itself. Memory tracing is transparent to the execution of the virtual machine, that is, the virtual machine cannot detect the presence of the trace. Moreover, the memory tracing mechanism may request that the set of locations to be traced should be specified with a given granularity, for example, one that would match the page size.

The memory tracing mechanism implemented in the preferred embodiment of the invention uses a combination of the processor's memory management unit (MMU), via page faults, and the ability, using either hardware or software (in particular, the binary-translation sub-system) to execute instructions one-by-one, that is, to single-step the virtual machine. The memory tracing mechanism can be implemented on top of the mechanism that virtualizes the physical address space of the virtual machine. This latter mechanism is present in conventional virtual machine monitors that support multiple virtual machines and can be implemented using known techniques. In the preferred of the invention, it is implemented by having the VMM manage the MMU through an address space separate from the one managed by the VM.

Memory tracing is used in three core modules of the VMM according to the invention:

1) To virtualize the segmented architecture of the virtual processor. Segmented architectures rely on descriptor tables stored in memory. However, virtualization prevents the processor from using directly the virtual machine segment descriptor tables, which forces the processor to keep a second, shadow copy of the tables. Memory tracing on these tables maintains the coherency of the two tables. This is described below.

2) To virtualize the page-table based (hardware-reloaded) MMU of the virtual processor. Again, the VMM cannot directly use the virtual machine's page tables, but rather must maintain a shadow copy. Memory traces on the page table pages guarantees the coherency of the shadow copy. For most architectures, this form of coherency is not required at all times, but rather only at explicit points that flush entries from the processor's "translation-lookaside" buffer. However, memory traces that keep the shadow page tables synchronized with the virtual machine page tables can lead to performance benefits.

3) To guarantee the coherency of the translation cache. When running with binary translation, memory traces placed on the pages that contain translated code guarantee the coherency of the code that is stored in the translation cache with the original virtual machine code.

The use of the MMU has two principal consequences. First, the granularity is fixed to match the page size; in other words, the sub-system can request only that particular pages in memory be traced. Second, since the MMU manages virtual-to-physical mappings and the traces are set on physical pages, the system needs to be able to manage mappings in the "reverse" direction, that is, physical-to-virtual mappings, through so-called "backmaps."

The backmap information is used to efficiently compute the inverse-mmu( ) function, that is, the set of virtual pages that currently map a specific physical page in the real (VMM) page tables. For example, in the preferred embodiment of the invention, the backmap information consists, for each virtual page, of two virtual page numbers. The inverse-mmu( ) function can therefore return zero, one, or two virtual pages that map any given physical page. Note that this backmap information is correct only when a given physical page is never mapped by more than two virtual pages. The VMM ensures that this condition never occurs. When a third page is inserted by the VMM into the page tables, the VMM chooses one of the two existing pages (according to any predefined selection scheme or even simply at random) and evicts it to make room for the incoming page.

To accomplish this memory mapping, the invention preferably implements a method with the following main steps:

1) If a trace is installed on a given page, then all entries returned by the inverse-MMU function have their permissions downgraded. A permission downgrade involves setting pages with a read-write trace to be inaccessible so that both read and write accesses lead to exeptions that are interpreted as traces. The permission downgrade sets pages with a write-only trace to be read-only, so that only writes to the page lead to faults 2) When an entry is inserted in the MMU, that is, a virtual-to-physical mapping is inserted, the permissions are downgraded according to traces on the physical page.

3) When a page fault occurs as a result of downgraded permissions on a page with a trace, the permission downgrade is temporarily removed and the virtual machine is allowed to complete the instruction that caused the fault.

4) Once the instruction that caused the fault completes, that is, the single-stepping of that instruction is successful, the MMU entry is restored to its original state with permissions downgraded. The subsystems that requested the trace are then notified of the access. Note that a single instruction can access multiple location in memory, each with a potential trace. In that case, more than one entry is restored and subsystems are notified of the accesses.

5) If the execution of the instruction leads to an exception of the virtual machine, then the MMU entries are restored to their default state. The subsystems are not notified, since the instruction never completed.

Some form of memory tracing mechanism is required to efficiently support translation cache coherency and to virtualize segmented architectures. The method outlined above is preferred because it has proven to be efficient, but other methods are also possible. For example, in the absence of specific hardware support, the main room for alternative solutions is in the implementation of the insertion rule. In the preferred embodiment of the invention, two backmaps are implemented; it would be an obvious adaptation, however, to maintain more than two backmaps.

It would also be an obvious adaptation to handle differently the overflow of the number of backmaps, for example by maintaining an additional flag that is set only when more than the maximal number of backmaps are present in the page tables. The inverse-mmu() function called on such a page with the flag set would have the side-effect of flushing the entire page tables before returning the empty set, since it cannot efficiently determine the backmap.

Virtualization of a Segmented Processor Architecture

The invention is able to virtualize even processors with a segmented architecture. Before discussing how the invention accomplishes this in the preferred embodiment, it is helpful to understand just what a segmented architecture even is. Once again, the common Intel x86 architecture will serve as the example.

Segmented Architectures—General

Figure 3:
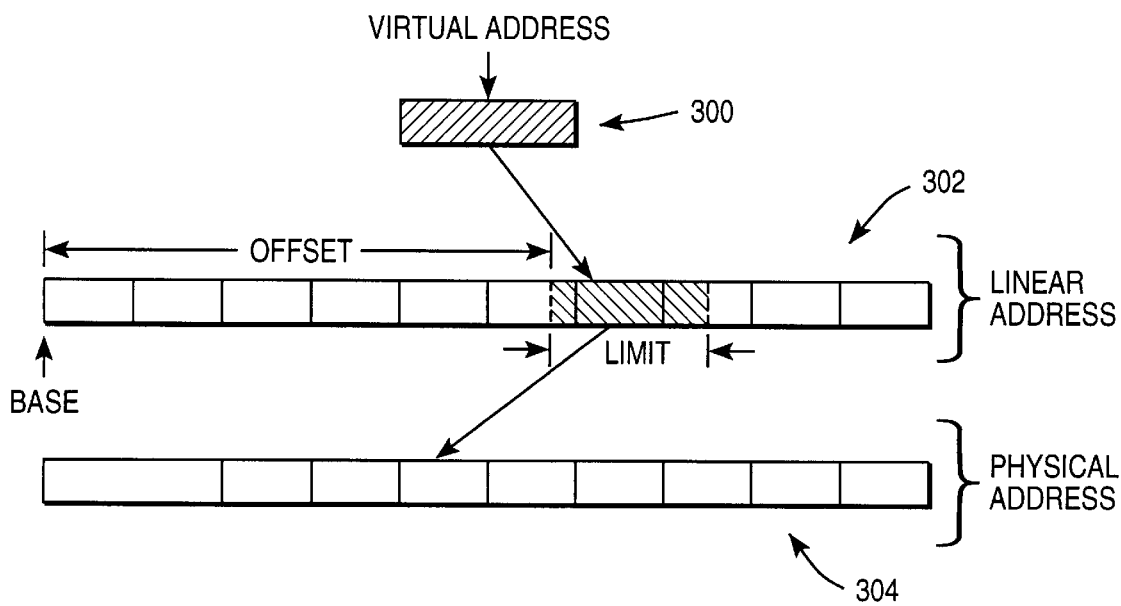
FIG. 3 illustrates the relationship between different address spaces of a segmented memory illustrates certain registers and tables used for handling descriptors.

See FIG. 3. In a segmented, paged architecture, memory references and instruction fetches go through two levels of translation, from the virtual address, illustrated as memory portion 300, via a segment in the memory's linear address, shown as address space 302, to the physical address, shown as address space 304. The segment in the linear address space 302 to which the virtual address points is located and delimited by the segment offset from a base, and the segment limit. As is explained further below, the segments are obtained from registers GDTR and LDTR that point into descriptor tables GDT and LDT.

Each memory reference and instruction fetch issued by the processor consists of a segment register/virtual address pair. The segment register is often determined implicitly by the instruction opcode and addressing mode. However, an instruction prefix can generally override the default segment. For example, the Intel x86 architecture has six segment registers in the processor:

CS—Code Segment, which specifies the currently executing instruction's address, as well as the address of the next instruction.

SS—Stack Segment, which specifies the address of the argument stack;

DS—Data Segment, which is used, in instructions that move constants or other data into a specified memory position; and ES, FS, GS—which act as "extra" segment registers.

The Intel architecture manual gives the complete description of the selection of segment registers.

Figure 4:
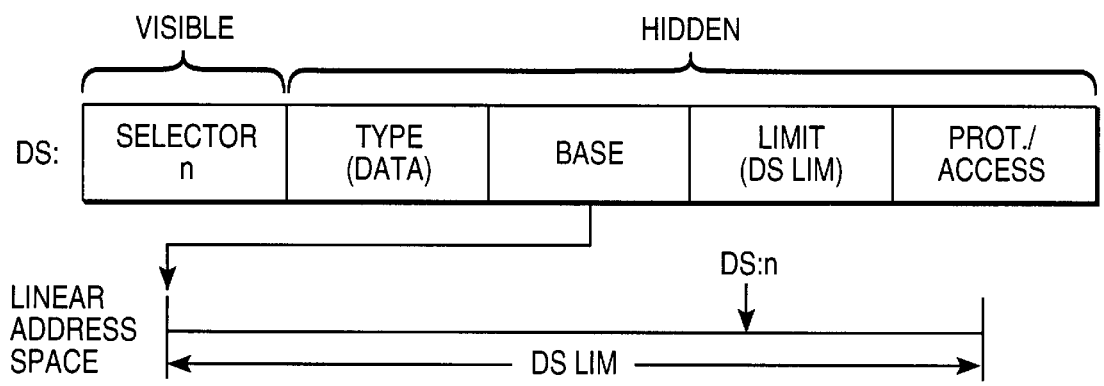
FIG. 4 illustrates the structure and function of a segment register.

FIG. 4 illustrates the general structure of a segment register, in this case, register DS. As is well known for certain architectures such as the Intel x86, each such segment register of the processor contains a visible part and a hidden part. The visible part forms a "selector" that is used to load the segment descriptor, as well as to get or set a particular segment. As is explained below, the selector is an index that points into either the GDT or the LDT to identify from which descriptor the hidden part of the segment register is to be loaded. The hidden part includes portions that specify a type (data or code), a base (offset) address in the linear address space and a limit or length of the segment. Protection or access data is normally also included. As FIG. 4 illustrates, the base and limit (here: DS LIM) are used to translate virtual addresses into linear addresses.

In the particular case of the six-segment register Intel x86 architecture, the six segments might have the following assignments for their selector (visible) and type (hidden). The base, limit and protection entries will of course vary. A special LDT descriptor is also included in the GDT. By way of example only, the segments shown in FIG. 5 might have the following entry assignments:

| Register | Selector | Type |
|----------|----------|------|
| CS | 8 | CODE |
| GS | 12 | DATA |
| DS | 16 | DATA |
| ES | 16 | DATA |
| FS | 16 | DATA |
| SS | 16 | DATA |
| LDT | 40 | DATA |

It should be understood that these selectors are simply examples of possible assignments. Actual values will be assigned by convention. This example is carried further in FIG. 5 below.

Most processor instructions imply some change of or reference to at least one segment. For example, the instruction "ADD 12, [nnn]" means adding 12 to the memory location at address nnn, where nnn is a virtual address which implicitly is part of the data segment "DS." If we refer once again to FIG. 4, the virtual address would be "nnn", and the corresponding linear address would be "nnn+BASE(DS)".

As is discussed above, the Intel x86 architecture contains different modes of operation. In "real mode" and "v-8086 mode," the processor can only set the offset field in the hidden part to the value of the selector multiplied by sixteen. In "protected mode," however, the selector is an index into the global descriptor table (GDT) or local descriptor table (LDT). When the segment register is assigned, the offset, limit and access bits are loaded from these tables, which are stored in memory. As part of this operation, the Intel x86-based systems use a technique known as "segment caching."

Segment caching is a property of the architecture that states that the contents of the segment registers, including the hidden parts, are not modified by a change of mode of operation between real and protected mode and by a modification of the global and local descriptor tables. In other words, the processor defines a caching semantic according to which it goes to the GDT or LDT only explicitly, that is, once a segment is loaded, the hardware processor refers to the contents of the segment's hidden part without further reference to the descriptor tables. The processor can, for example, load a segment in protected mode at index 8 in the global descriptor table and then modify the contents in memory at index 8 in that table. This modification of the descriptor in memory has no impact on the content of the segment register. A segment is then defined to be "non-reversible" if either the processor is currently in a different mode than it was at the time the segment was loaded, or is in protected mode when the hidden part of the segment differs from the current value in memory of the corresponding descriptor.

Segment caching has significant implications for the virtualization of the architecture. One of the requirements of the virtual machine monitor according to the invention is the ability to handle traps (exceptions and interrupts) transparently to the execution of the virtual machine. On a segmented architecture, however, a trap will necessarily cause certain segments to be saved and replaced. If that segment is non-reversible at the time, the VMM will be unable to restore it, since no copies of the hidden descriptor exist in memory. The manner in which the invention overcomes this problem is through the use of shadow descriptor tables. This is illustrated and described below.

Example of Segment Non-Reversibility

Consider the instruction "MOV value→segment", which involves two operations: 1) set the "selector" (visible) part of the specified segment (for example, DS) to value; and 2) set the hidden part to the contents of the GDT/LDT at the index value. The hidden part, however, as its name implies cannot be accessed by software instructions.

Assume the following instruction sequence:
1) The virtual machine executes instruction "MOV m→DS", which means that the segment (say, X) at GDT offset position m is loaded into the register DS;
2) The virtual machine then changes the contents in position m its GDT from X to Y; this will not affect the segment register DS; and
3) The VMM the executes instruction "MOV n→DS", which means that the segment (say, Z) at GDT offset position n is loaded into the register DS.

Without further measures, then it will be impossible for the VMM to restore the previous setting of DS, since executing the same instruction as in 1) would load Y, not X, since X is no longer at position m in the GDT. The segment has thus become non-reversible. This invention provides a method for overcoming this problem.

Descriptor Tables

In order to virtualize segmented architectures such as the Intel x86, the invention makes use of various descriptor tables. Such tables are well understood in the field of computer design, but a review is helpful for later understanding how the invention sets up and uses "shadow" descriptors.

Figure 5:
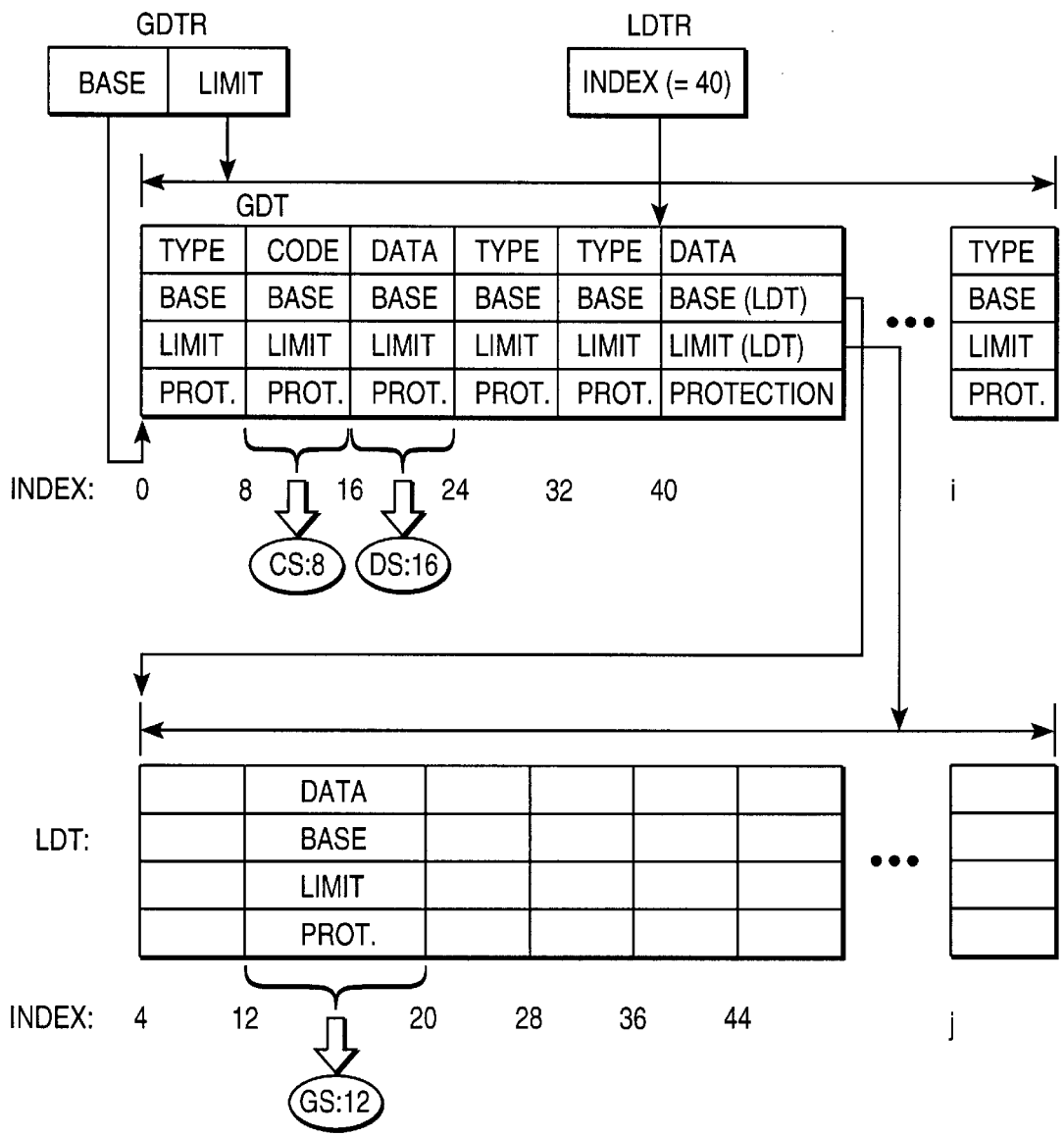
FIG. 5 illustrates the structure and function of descriptor tables used in the VMM according to the invention.

FIG. 5 illustrates the function and structure of the Global Descriptor Table (GDT), the Local Descriptor Table (LDT) and two registers—the Global Descriptor Table Register (GDTR) and the Local Descriptor Table Register (LDTR)—that are used to access the GDT. Note that this terminology is found primarily in descriptions of Intel x86-bases systems, but that analogous descriptor tables are found in other architectures.

The GDTR is a privileged register of the hardware processor, which contains a pointer to the base address in memory of the GDT, as well as an indication of the length or limit of the GDT. As its name implies, the GDT can be viewed as a table. In FIG. 5, each column (four columns are shown merely as an example) corresponds to one "descriptor."

The elements of each descriptor include a type, a base, a limit, and some protection flags. The type can refer, for example, to a DATA segment, or to a CODE segment. For example, on the Intel x86, a DATA type is required to load a descriptor into the DS, SS, ES, FS, and GS segments. A CODE type is required to load a descriptor into CS.

One of the GDT's descriptors also describes the location (base) and size (limit) of the local descriptor table LDT. The LDTR itself is an index (here: equal to 40) into the Global Descriptor Table. The descriptors in the LDT have the same format as the ones in the GDT, that is, each descriptor specifies a type, a base, a limit, and some protection flags.

The processor loads segments from the descriptor tables by means of specific and unprivileged instructions. These instructions determine the value of the segment selector. In Intel x86 systems, the index into the table is determined by all but the lowest 3 bits of the selector. The choice of the table (global or local) is determined by bit 2 of the selector, with a set bit referring to an entry in the local descriptor table and a clear bit to an entry in the global descriptor table.

In the example, the LDTR is set to index 40. This descriptor determines the location and size of the LDT. Furthermore, the CS segment is set by way of example to a selector index of 8, that is, the second descriptor in the global table. The DS, ES and FS are set to an index of 16, and GS is set to a value of 12, the second index in the local descriptor table. (Bit 2 of the binary representation of "12" is set, thus specifying the local table.)

Operating systems typically manage the global and local descriptor table, although certain operating systems are known to export this facility to applications. The choice of the global/local table for a descriptor is left to the software. By convention, operating system descriptors (for example, the ones with the lowest privilege level) are in the global descriptor table. Application-specific descriptors can be put into a local descriptor table. Note also that different applications that are running on the virtual machine can use different LDTs. The VMM can easily switch between these LDTs simply by the proper corresponding assignment of the LDTR.

In order for the VMM to virtualize the existing system, the VMM sets the value of the hardware processor's GDTR to point to the VMM's GDT. Since the GDTR is accessible to system-level procedures such as the VMM, this may be done using known programming techniques.

The illustrated example relates to the Intel x86 architecture, which has an LDT separate from its GDT. Separate descriptor tables are not, however, necessary to implement or manage a segmented memory architecture—one properly structured descriptor table could combine the functions of the GDT and LDT. Modification of the invention to allow its use in such single descriptor-table systems will be obvious to those skilled in the art of virtualization techniques.

Shadow Descriptor Tables

Figure 6:
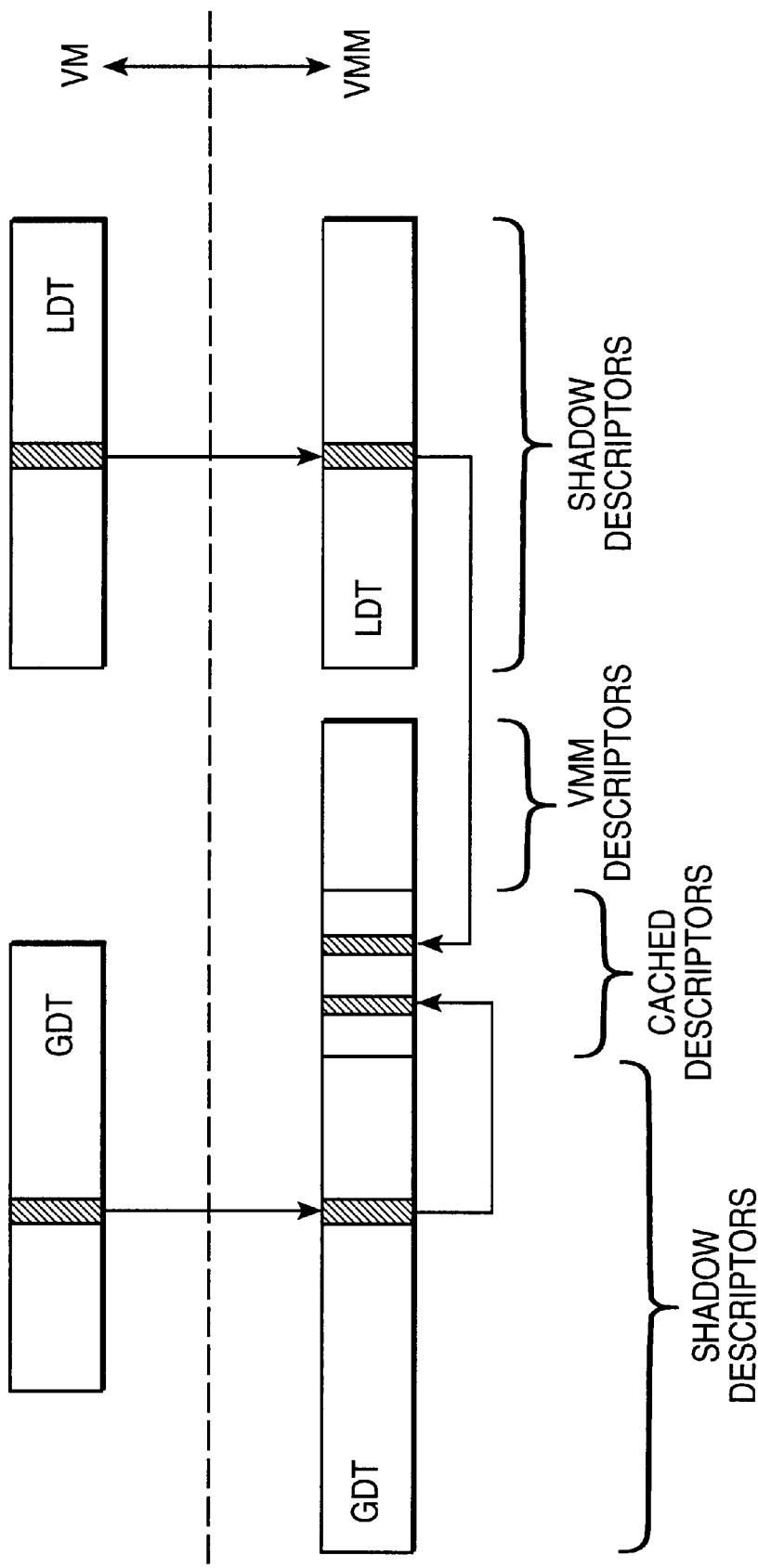
FIG. 6 illustrates shadow descriptor tables used in the VMM according to the invention.

See FIG. 6. The VMM cannot directly use the virtual machine's GDT and LDT, as this would allow the virtual machine to take control of the underlying machine. The VMM therefore must manage the processors own GDT and LDT and ensure the coherency between the two copies. To accomplish this, the VMM reserves one entry in its own GDT for each segment register of the processor. These "cached descriptors" thus emulate the segment-caching properties of the architecture itself. When the invention is used to virtualize the Intel architecture, for example, there are therefore six cached descriptor entries.

Moreover, the VMM needs to reserve a certain number of entries in the GDT for its own internal purposes. These "VMM descriptors" are also part of the GDT. The remaining entries in the "real" (VMM-based) GDT and LDT thus "shadow," that is, copy and follow the changes in, the entries in the GDT and LDT of the virtual machine. Note that the virtual machine may set its GDT to the maximal size supported by the hardware, or to a size that exceeds the space reserved by the VMM for GDT shadow descriptors. In both cases, there exist descriptors in the virtual machine GDT with no corresponding shadow entries in the VMM-based GDT. As will become clear later, any attempt by the virtual machine to directly use a non-shadowed descriptor will lead first to a general protection fault, and subsequently to a transition to binary translation. Note that the cached descriptors and certain VMM descriptors could alternatively be located in the LDT, thereby reducing the maximal size of the shadow LDT, but increasing the maximal size of the shadow GDT.

Descriptor Conversion of Protected Mode Descriptors

The virtual machine descriptor tables and the real descriptor tables are kept coherent, that is, in correspondence, but not necessarily identical. In one working implementation of the invention for the Intel x86 architecture, for example, the following conversion function is applied to both the shadow entries and the cached entries. This conversion algorithm allows the virtual machine to perform directly and safely segment operations:

1) For DATA and CODE descriptor entries, the shadow entry is the copy of the virtual machine entry, with the following exceptions:
   a) The linear address range of the shadow entry never overlaps with the VMM's own range of the linear address space. (This is required in the preferred embodiment of the invention since the VMM and VM share the same linear address space.) The conversion truncates the range of the shadow segment to ensure this property. The VMM then emulates any general protection faults that result from the truncation.
   b) Entries with a Descriptor Privilege Level (DPL) of 0 in the virtual machine tables have a DPL of 1 in the shadow tables. Direct execution is used only when running at current privilege level 2 and 3. The change from 0 to 1 is required to use the segments in binary translation, which runs at current privilege level 1.
2) For GATE descriptors, the target code segment selector is set to zero in the shadow entry. The virtual machine cannot detect this modification. However, any attempt to jump or call through this gate by the virtual machine in direct execution will lead to a general protection fault, which the VMM handles.

Instructions that load segments are typically not privileged. However, they do check the descriptor privilege level (DPL), which is encoded in the protection flags of the descriptor to be loaded. Attempts to load a segment at a descriptor privilege level smaller (that is, more privileged) than the current privilege level (CPL) of the processor will result in a trap. On the Intel x86 architecture, this trap is a general protection fault.

In direct execution, the invention guarantees that the virtual machine (VM) will never directly load a cached descriptor or a VMM descriptor by setting these descriptors with a descriptor privilege level lower than the lowest CPL supported by direct execution. (In one implementation of the invention, this was level 2.) Attempts by the VM to load a segment that is not a shadow descriptor will therefore always lead to a trap. In order to emulate this trap, when the VMM—specifically, the decision sub-system 204—detects the trap, the decision sub-system activates the binary translation sub-system and cached descriptors are used, since there is no corresponding shadow descriptor.

In binary translation, both the VM and the VMM operate at the same privilege level; consequently, the descriptor privilege level cannot be used to prevent the VM from loading non-shadowed descriptors. The binary translator therefore emulates each segment-loading operation by first checking that the index of the segment corresponds to a shadow descriptor, before loading the segment. If the index does not correspond to the shadow descriptor, then the cached descriptor is used, since there is no shadow descriptor.

Segment Tracing

In the preferred embodiment, segment tracing is used to ensure the coherency of the shadow descriptor tables. If the virtual machine (VM) changes the GDT or LDT through a LGDT or LLDT instruction respectively, then the VMM emulates these privileged instructions. It then scans and converts all the shadow entries of the GDT and LDT. Memory traces are then installed on the virtual machine's global and local descriptor tables. Changes made by the virtual machine's operating system to either table are therefore immediately reflected in the shadow tables.

The VMM thus stores accesses to the virtual machine's GDT and LDT according to the following routine:

1) If a write is made to the virtual machine's GDT/LDT, then check whether the write corresponds to a currently loaded segment.
2) If it does not, then copy the write down into the VMM's shadow copy of the virtual machine's GDT/LDT (but convert any system-level VM descriptor to a user-level descriptor, since the VM cannot be allowed to run at actual system level).
3) If it does correspond to a loaded segment, then:
   a) Copy the old contents of the VMM's GDT/LDT into a cached copy, with one entry per segment;
   b) Update the contents of the VMM's shadow GDT/LDT to correspond to the current, written-to GDT/LDT values of the VM; and
   c) Switch to binary translation, since there are now two different notions of the segment selectors (the actual VM selector and the used selector that's now one of the cached entries).

This procedure can be likened to a hike with no navigational aids along a narrow, tortuous trail through a forest obscured by fog so impenetrable that one can see only one step ahead. As long as one remains on and follows the trail exactly, there is no ambiguity concerning the proper direction to walk in. As soon as one leaves the main trail, however, then returning to the original trail would be impossible barring incredible luck. One way to leave the main trail "reversibly," that is, so that one can find one's way back to it, would be to carry some marker, say, a length of string, one end of which would be staked to the main trail and which would be unwound as one walked into the forest. One would then simply follow the string back in order to return to the main trail.

In the context of this invention, the trail is the virtual machine's instruction sequence. When the VM is "on the trail," then so is the VMM (on its parallel "shadow" version) there is no ambiguity about position or proper direction—the VMM can then use direct execution. When at least one segment is in a non-reversible state, the cached entry corresponding to each such segment serves as a marker for returning to the trail. As long as the VM is off-trail, the VMM uses binary translation to avoid the ambiguity about which set of selectors is "correct."

At the heart of the invention is thus the VMM's incorporation of both direct execution and binary translation. Because of the differences in these two types of execution, the VMM must handle segment virtualization differently when operating in the different modes.

With direct execution, the virtual machine directly assigns segment registers. However, rather than using the virtual machine's tables, the hardware looks at the VMM's shadow tables. An attempt to use an entry with index greater than the maximum shadow entry, that is, a cached or VMM descriptor, will then lead to a general protection fault, since these entries all have a descriptor privilege level that is lower than the current privilege level. Consequently, binary translation must be used as long as this segment register is loaded in the virtual processor.

When in the direct execution mode, the memory traces installed on the descriptor tables perform two distinct operations. First, they ensure the coherency of the shadow tables with the virtual machine tables. Second, they determine whether the virtual machine contains a non-reversible segment, which occurs when the virtual machine writes to a descriptor that is currently loaded in one of the six entries of the virtual processor. Binary translation must be used whenever the processor has at least one non-reversible segment.

In the binary translation mode, the corresponding execution engine maintains two selectors for each segment register. The first selector is an "architectural selector" and is set to the segment register of the virtual processor. The second selector is a "hardware selector" and is set to the index to be loaded in the corresponding hardware segment selector. If the virtual processor is in protected mode, then the segment selector is set to either the architectural selector, when it points to a shadow entry, or to the cached selector if the segment is outside the range of the shadow entries or the segment is non-reversible.

The hardware selector must use the cached entry whenever the segment has been loaded in real mode, whenever the segment is out of the range of shadow entries, and whenever the segment is non-reversible. Direct execution can only resume when all hardware selectors match the architectural selectors and don't need the cached entries. When a protected mode segment becomes non-reversible because of an assignment to the virtual machine's descriptor table, the VMM first copies the shadow entry to the cached entry and then converts the virtual machine entry into the shadow entry.

Two aspects of the invention have been discussed above; these can be summarized as follows: The first aspect of the invention enables the use of direct execution as long as the virtual machine is running in a non-privileged mode. The second aspect of the invention refines the decision to use direct execution to the cases where no loaded segments are in a non-reversible state. At the heart of the second invention is the segment-tracking mechanism and the use of both shadow and cached descriptors.

Execution Mode Decision

As the preceding discussion indicates, the decision of whether to use binary translation or direct execution depends on the segment state. It also depends, however, on the privilege level of the system, which, in the Intel x86 context, is also tied to which operating mode the system is in.

Three of the Intel x86 modes present obvious choices: Because the v8086 mode is truly virtualizeable, the system according to the invention may always select direct execution when the virtual machine is in this mode. On the other hand, the real and system management modes are not virtualizeable, so the decision sub-system according to the invention will always select the binary translation engine when the virtual machine is running in this mode.

A system (virtual machine) running in protected mode is not strictly virtualizeable, which forces the decision sub-system according to the invention to rely on a more sophisticated decision function, since both direct execution and binary translation may be used at different stages of the virtualization. This is discussed further below, and will also involve consideration of the particular current state of the processor.

The real mode of execution of the Intel x86 processor differs from the protected mode of operation primarily in the semantic of segment operations. REAL mode, which was the only mode in Intel systems based of the 8086 processor, does not use descriptor tables, but rather computes the offset of the segment (in the hidden part of the segment register) by multiplying the visible part by 16. It leaves the limit unmodified and ignores protection bits. The invention thus sets up the descriptor cache, but simply sets the base of the cached descriptors to 16 times the selector. Consequently, when the system is in REAL mode, then the invention does not apply the GDT/LDT procedures described above, but rather, it acts as if there is no protection at all.

The Intel processors contain the special execution mode—the v-8086 mode—that has been specifically designed to support backward compatibility of legacy REAL mode programs and operating systems on more modern operating systems. Although this mode allows the virtualization using direct execution of programs that use only REAL mode, it is useless for the virtualization of programs that alternate between REAL mode and PROTECTED mode, and rely on the segment caching properties of the processor. In practice, many DOS applications use these features to increase the amount of accessible memory.

In the x86 architecture, there are certain non-virtualizeable instructions in real mode, that is, there are instructions that behave differently in v-8086 mode without trapping in either. According to the invention, virtual-8086 mode is therefore not used to virtualize the execution in REAL mode; rather, the invention uses binary translation running in protected mode. For each segment, the architectural selector contains the real-mode segment base, and the hardware selector always points to one of the six fixed cached entries. An assignment to a segment register in real mode is then reflected in the architecture selector, and in the cached entry. Consider the following software illustration, in which Sx is the segment being loaded and "val" is the value to be loaded in the descriptor:

```
Emulate(mov Sx, val)
(1)     ARCH_SEGMENT[Sx] = val;
(2)     GDT[CACHED_ENTRIES + Sx].offset = val * 16;
            If (Sx in {SS,DS,ES}) {
(3)     Mov Sx, (CACHED_ENTRIES + Sx);
            }
```

Statement (3) reflects the change in the virtual segment on the underlying processor. It is only required for three of the six segments because of the way that the binary translator uses segments.

The use of a binary translation sub-system to virtualize the execution of REAL mode programs is also an advancement over the state of the art. Previous legacy virtual machine monitors relied on direct execution and the special v-8086 mode of the processor to perform a comparable task. However, the use of this special mode severely limits such systems to the applications that can run in the legacy virtual machine. The invention's use of a binary translator running in protected mode removes all of these limitations.

For protected mode, the decision to use direct execution or binary translation is a function of the state of the processor and the reversibility of the segments. As is mentioned above, direct execution can be used only if the virtual machine is running in an unprivileged mode, since the architecture contains non-virtualizeable instructions. For the Intel x86 processor running in protected mode, the notion of privilege is a function of the processor's CPL (or ring level), as well as the state of the interrupt flag and IO privilege level, both of which are stored in the processor's EFLAGS register. A CPL of 0, a cleared interrupt flag, and an I/O privilege level greater or equal to the CPL indicates privileged execution for the purpose of this invention, and required binary translation. In one working prototype of the invention, a CPL of 1 also leads to the use of binary translation merely because it simplifies the implementation, even though it is rarely used in practice.

The second element of the decision for protected mode is a function of the reversibility of the segments. This may be described best by analogy to a simple state machine.

Invention as State Machine

In its manner of handling the various modes of the Intel x86 architecture, the invention can be viewed as a state machine with three states, NEUTRAL, CACHED and REAL. In the NEUTRAL state, the hidden descriptors correspond to the selector index. The system can therefore load the descriptors into the processor with no need to change the memory. The VMM can then use direct execution. The CACHED state includes all modes except REAL.

The "REAL" state corresponds to segments that have been loaded while the processor is in either REAL mode or in system management mode. The VMM according to the invention switches to binary translation whenever the state is CACHED or REAL.

State transitions occur as follows:

| From State | To State | Transition |
| --- | --- | --- |
| NEUTRAL | CACHED | A write into memory, that is, into a loaded descriptor (one of the six segment registers in the GDT or LDT) |
| CACHED | NEUTRAL | The VM loads a segment in protected mode, that is, the VM explicitly "resets" the segment. |
| NEUTRAL | REAL | A segment load in REAL mode. (Note that there is a readable bit in the hardware processor that indicates whether the segment load is protected or REAL) |
| REAL | NEUTRAL | A segment load in protected mode. |
| CACHED | REAL | A segment load in REAL mode. |

A Note that this state-machine representation makes no reference to segments loaded in virtual-8086 mode. This mode of the processor is strictly virtualizeable (with direct execution) and loads all six segments every time that the processor enters this mode. As a result, segments are handled differently in v-8086 mode, independently of this state machine.

Note also that there is one state machine per segment of the processor. The VMM according to the invention switches to direct execution only when all state machines are in the NEUTRAL state.

Binary Translation Sub-System

FIG. 2 also shows the general structure of binary translation execution engine 200 or sub-system according to the invention. The binary translation subsystem is responsible for the execution of the virtual machine whenever the hardware processor is in a state where direct execution cannot be used.

The binary translation execution engine 200 according to the invention contains several sub-systems, which, as is well known, are implemented as either stored instruction sequences (programs), addressable portions of system memory, or both. These sub-systems include a translator 230, a translation cache (TC) 240 a central loop sub-system (Resume) 242, a synchronization sub-system 244 that includes a TC synchronization map 246, a TC hash table 248, and a TC coherency sub-system 250.

The core of any binary translation execution engine is the translator 230. As is well known, such a translator reads a sequence of instructions from the virtual machine 120 and generates a corresponding sequence of instructions that emulates the original code sequence in a safe manner. For example, if the original sequence from the virtual machine contains a privileged instruction, then the translator 230 emits a code sequence that emulates that privileged instruction, possibly without even issuing any privileged instructions. The emitted code sequence may also contain code that calls support routines of the VMM; such sequences are commonly referred to as "callouts." Any known techniques may be used to design the translator 230.

Translations are stored in a large buffer, namely, the translation cache 240. This is also a known technique. An access function, that is, the TC hash table 248, keeps a map of the starting instruction pointers of the virtual machine that contain a translation, together with the starting address of the corresponding emitted sequence in the translation cache 240. In other words, once an instruction or instruction sequence from the virtual machine is received and translated, and the translation is stored, the TC hash table 248 stores the respective starting points of the sequences. This allows translations to be reused, at least as long as the original sequence has not changed. This, in turn speeds up the system, since unchanged instructions from the virtual machine do not need to be retranslated every time the VMM receives them.

The code sequence emitted by the translator 230 preferably ends with a callout to the main loop 242 to emulate the next sequence of instructions. To avoid calling the main loop too often, the binary translation execution engine 200 used in this invention preferably uses a technique known as "chaining." This is also a well-known technique that allows an emitted sequence to directly jump to the start of another emitted sequence. As in conventional systems, the central loop 242 is also preferably used by the VMM to call out to support routines; in the invention, such routines are those that are designed in any known way to emulate the desired architecture.

In order to understand the synchronization sub-system 244 one must keep in mind certain aspects of the translator 230. Note first that instructions or instruction sequences from the VM that are input to the translator 230 are indivisible or "atomic," that is, they are either completed in full or they are not considered to have been executed at all. The result of the translation of even a single instruction input to the translator 230 may, however, be more than one instruction; similarly, it is not at all certain that a sequence of n instructions input to the translator will result in exactly n instructions in the translation.

The reason this can be a problem is that, for example, an exception might occur during the execution of the translated sequence, which might then not be at the same point as, that is, in synchronization with, where the original instruction would have been. It is therefore necessary to guarantee the "atomicity" of the virtual machine's instructions if the operation of the VMM is to be transparent to the VM. As part of this safeguard, if an exception occurs during the middle of execution, then the system needs to restore the state of the VM to its previous execution entry point, that is, to the beginning of the instruction. The translator 230 thus has two outputs: 1) the code generated to for execution (the translation); and 2) a pointer into the TC synchronization map 246 so that it will be possible to reverse portions of the execution.

The TC synchronization map 246 is a table that partitions the TC 240 into regions of different lengths. Each region is associated with the address of the instruction used as the source of the translation and a type that uniquely identifies how the translation was performed.

There are two main ways of simulating execution of the IP for the virtual machine. One method is to increment the IP for each instruction. Although simple, this method is very expensive in terms of processing time, effectively adding one instruction to the end of every other instruction sequence. Another method—that preferred in this invention—is to store the IP for each TC region in the map 246. On the rare occasion when the system needs to know the position within any given region of the TC, it can then can recompute the corresponding IP.

Translation Cache Coherency

Binary translators achieve high speeds by converting an input instruction stream into a target instruction stream, and caching these translations so that the subsequent execution of the instruction stream can reuse the same target instruction sequence. Translation cache coherence is the guarantee that the binary emulator will detect changes in the original code so that it can update the emitted code accordingly.

Translation-cache coherency can be implemented exclusively using the memory tracing mechanism described above. When the translator 230 reads a new page of original code, it installs a write-only trace on the physical page. Subsequent writes to that page will indicate a potential coherency violation. At this time, the translator removes the incoherent translations from the translation cache. The simplest implementation of the removal algorithm is to remove all translations from the translation cache.

This first solution has a few notable advantages. First, it relies exclusively on a single procedure—memory tracing—to detect the violations. Since that mechanism is also used by other parts of the system, it does not increase its complexity. It also eliminates the need for additional data structures otherwise required exclusively to track the list of translations based on a given page or memory range. Furthermore, it allows the translator to dynamically chain translations without having to remember the list of locations in the translation cache that jump to a given translation.

There are, however, certain disadvantages associated with a solution based solely on memory tracing. In its base form, the procedure only sets up traces on the physical pages that contain at least one single byte of code. As a result, the system must conservatively assume that any write to the page violates the coherency, even if the write corresponds to a location that does not contain code. This means that the eventual re-translation of all current translations may be needed.

According to an alternative method for assuring TC coherency, the VMM calculates a simple performance model. As one example, the VMM could assign the cost of maintaining coherency to be equal to the product of the number of violations with the cost in time of handling the conflict. Experience has shown, however, that the advantages of the "brute-force" memory-tracing-based method clearly outweigh its disadvantages, provided that the number of violations remains small. These advantages include a reduction in the memory overhead, a simpler procedure, and the ability to dynamically chain translations without having to update data structures. Rather than reducing the performance penalty associated with a violation, the goal then becomes to limit the number of violations.

The concepts and techniques for maintaining translation cache coherency are well known in the field of system virtualization and are therefore not discussed in greater detail here. Any conventional method may be implemented to ensure translation cache coherency in the invention. As the two alternatives above illustrate, the decision about which method to use will depend on a given system's requirements for performance, memory availability, and simplicity.

System Architecture According to the Invention

This invention is directed primarily to a dual execution mode virtual machine monitor VMM. However, a VMM does not operate in isolation, but rather within a larger system. The system illustrated in FIG. 7 is one in which a successfully working version of the invention has been incorporated.

Figure 7:
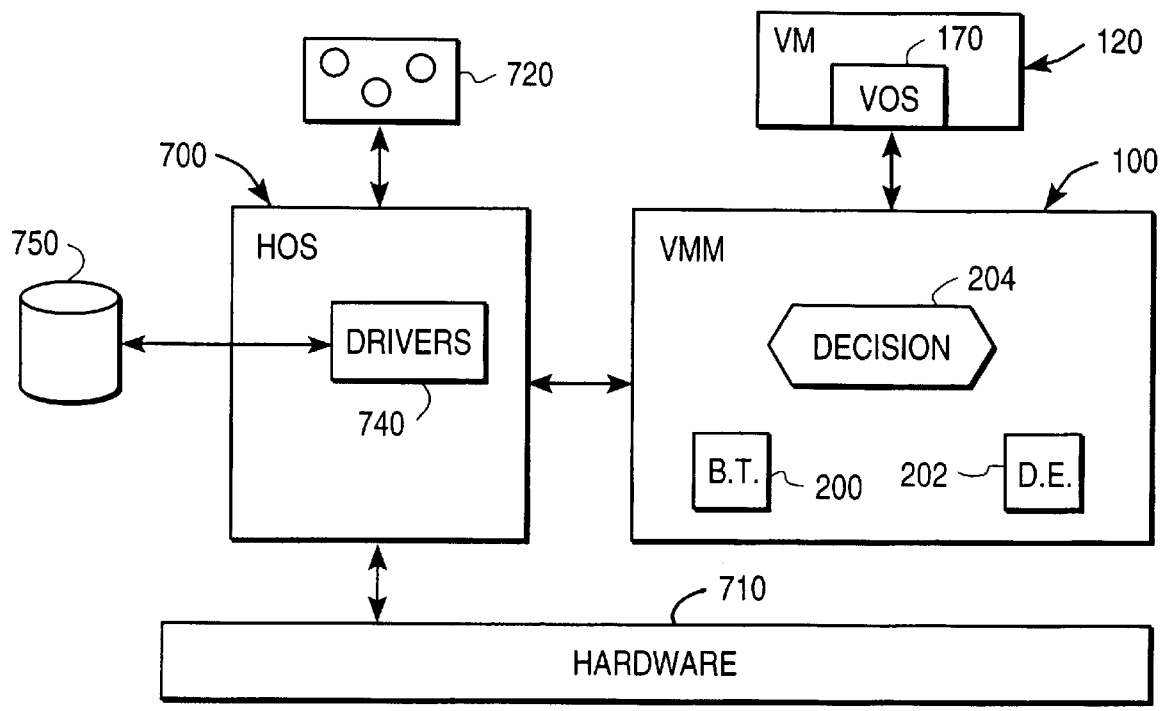
FIG. 7 is a block diagram that illustrates the high-level system architecture of a system that incorporates a system-level virtual machine monitor (VMM) according to the invention and that includes execution engines for both binary translation and direct execution, as well as a decision sub-system to decide on and coordinate transitions between the two.

FIG. 7 shows the total system incorporating the invention in its broadest terms: a protected host operating system (HOS) 700 is combined with at least one unconstrained, system-level virtual machine monitor (VMM) 100 according to this invention. The VMM 100 directly uses portions of the hardware's 710 processor to execute an associated virtual machine (VM) 120. The way in which this is preferably done, and the additional sub-systems included, are described in co-pending U.S. patent application No. Ser. 09/151,175 "System and Method for Virtualizing Computer Systems," which is incorporated by reference here.

FIG. 7 shows one virtual machine monitor 100 supporting one virtual machine 120. The system according to the invention makes it possible to include any number of VMM's in a given implementation, each supporting a corresponding VM, limited only by available memory and speed requirements, and to switch between the various included VMM's. It is assumed merely for the sake of simplicity that the VMM 100 is the one actively in operation on the system.

A set of applications (symbolized by circles) is indicated in FIG. 7 by the block 720. This set of applications is assumed to be designed to run "normally" via the existing host operating system (HOS) 700. In other words, the applications 720 are written for the HOS 700. Other applications, however, may not be. For example, an application written to run on one of Microsoft's operating systems, such as any of the Windows systems, will not normally run on the Unix operating system, and vice versa. If the host operating system is, for example, some version of Windows, with Intel-based hardware, then a Unix application cannot normally be expected to run on the system. This invention makes this possible.

Assume that the virtual machine (VM) 120 is designed as a virtual Unix system and that the applications 720 in the VM are thus Unix-based applications. The virtual machine 120 then will also include the virtual operating system (VOS) 700, which communicates with the "real," or "physical" system hardware 710 via the VMM 100. Note that many different types of applications may be run on the same physical machine, regardless of what the host operating system and hardware are. Each application is thus associated with its intended operating system, either the host operating system 700 (applications 720), or with a respective virtual operating system 170, associated in turn with a respective VMM 100.

Current computer systems, and especially personal computers, support a wide range of external devices 750 that each interact in a different manner with the system software. As a result, each device requires special system software support. Corresponding device drivers 740 are typically downloaded into the operating system to provide this support.

No-HOS Embodiment

Figure 8:
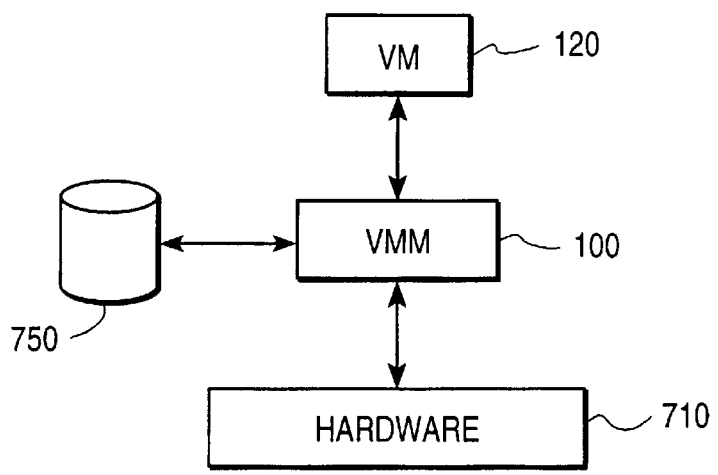
FIG. 8 is a block diagram of a second embodiment of the invention in which the system in which the virtual machine monitor according to the invention is incorporated has no host operating system.

FIG. 8 is a block diagram that illustrates the fact that invention—switching between binary translation and direct execution modes—does not require a host operating system. Rather, the VMM according to the invention may be configured using known techniques to issue its instruction calls directly to the hardware processor, and, if suitable drivers are included, to directly access and control the external devices 750.

Multi-Processor Embodiment

FIGS. 7 and 8, as well as the description of the invention above, have assumed the presence of a single processor in the hardware 710. This assumption has been made solely to simplify the discussion. The invention may also be used where the hardware 710 includes more than one processor.

The use of multiple processors allows, for example, the simultaneous execution of multiple virtual machines, or the execution of a virtual machine with multiple virtual processors. The virtualization of each processor is handled separately and independently, including the decision as to whether to use direct execution or binary translation. For each virtual processor, the VMM will then maintain a separate set of global and local shadow descriptor entries.

One minor extension needed when using the invention in a multi-processor environment involves the memory tracing mechanism, which is used, for example, by the VMM for segment tracking and translation cache coherency. What is required is some interaction between processors when traces are installed and when traced accesses occur. This interaction between processors can be implemented using known techniques such as inter-processor interrupts (IPI's).

We claim:

1. A system for virtualizing a computer comprising:
   a hardware processor;
   a memory;
   a virtual machine monitor (VMM); and
   a virtual machine (VM) that has at least one virtual processor and is operatively connected to the VMM for running a sequence of VM instructions, the VM instructions including directly executable VM instructions and non-directly executable instructions;
   in which:
      the virtual machine monitor includes:
         a binary translation sub-system;
         a direct execution sub-system; and
         an execution decision sub-system forming decision means for discriminating between the directly executable and non-directly executable VM instructions, and for selectively directing the VMM to activate the direct execution subsystem for execution by the hardware processor of the directly executable VM instructions and to activate the binary translation subsystem for execution on the hardware processor of the non-directly executable VM instructions.

2. A system as in claim 1, in which:
   the hardware processor has:
      a plurality of privilege levels; and
      virtualizeable instructions and non-virtualizeable instructions, in which the non-virtualizeable instructions have predefined semantics that depend on the privilege level, in which the semantics of at least two of the privilege levels are mutually different and non-trapping;
   the virtual machine (VM) has a privileged operation mode and a non-privileged operation mode; and
   the decision means is further provided for directing the VMM to activate the binary translation sub-system when the VM is in the privileged operation mode.

3. A system as in claim 1, in which:
   the hardware processor has a plurality of hardware segments and at least one hardware segment descriptor table that is stored in the memory and that has, as entries, hardware segment descriptors;
   the virtual machine (VM) has VM descriptor tables having, as entries, VM segment descriptors;
   the virtual processor has virtual segments;
   the VMM includes:
      VMM descriptor tables, including shadow descriptors, corresponding to predetermined ones of the VM descriptors tables; and
      segment tracking means for comparing the shadow descriptors with their corresponding VM segment descriptors, for indicating any lack of correspondence between shadow descriptor tables with their corresponding VM descriptor tables; and for updating the shadow descriptors to correspond to their respective corresponding VM segment descriptors.

4. A system as in claim 3, in which the VMM additionally includes one cached entry in the VMM descriptor tables for each segment of the processor, the binary translation sub-system selectively accessing each cached entry instead of the corresponding shadow entry.

5. A system as in claim 4, in which:
   the hardware processor includes detection means for detecting attempts by the VM to load VMM descriptors other than shadow descriptors, and means for updating the VMM descriptor table so that the cached entry corresponding to the processor segment also corresponds to the VM segment descriptor, and means for activating the binary translation sub-system, the binary translation sub-system using this cached entry until the processor segment is subsequently loaded with a VMM descriptor that is a shadow descriptor.

6. A system as in claim 4, in which:
   the hardware processor has predetermined caching semantics and includes non-reversible state information;
   the segment tracking means is further provided for detecting attempts by the VM to modify any VM segment descriptor that leads to a non-reversible processor segment;
   the VMM includes means for updating the VMM descriptor table so that the cached entry corresponding to the processor segment also corresponds to the VM segment descriptor, before any modification of the VM segment descriptor;
   the decision means is further provided for directing the VMM to activate the binary translation sub-system when the segment-tracking means has detected creation of a non-reversible segment, the binary translation sub-system using the cached entry until the processor segment is subsequently loaded with a VMM descriptor that is a shadow descriptor.

7. A system as in claim 4, in which:
   the hardware processor has a native mode;
   the virtual processor has native and non-native execution modes, in which the non-native execution modes are independent of the VM segment descriptor tables for accessing segments;
   the decision means is further provided for directing the VMM to operate using the cached descriptors and to activate the binary translation sub-system when the hardware processor is in the non-native execution mode, the binary translation sub-system using the cached entry in the native mode when at least one of the following conditions is present: the virtual processor is in one of the non-native execution modes; and at least one virtual processor segment has been most recently loaded in one of the non-native execution modes.

8. A system as in claim 4, in which:
   the hardware processor and the virtual processor each has native and non-native execution modes, in which at least one of the non-native execution modes is strictly virtualizeable; and the decision means is further provided for directing the VMM to run in the same execution mode as the virtual processor.

9. A system as in claim 3, in which the hardware processor has a memory management unit (MMU), further comprising:

memory tracing means included in the VMM for detecting, via the MMU, accesses to selectable memory portions;

the segment tracking means being operatively connected to the memory tracing means for detecting accesses to selected memory portions.

10. A system as in claim 1, in which the hardware processor has an Intel x86 architecture that is compatible with at least the Intel 80386 processor.

11. A system as in claim 1, in which:

the hardware processor has an Intel x86 architecture, which has at least one non-virtualizeable instruction;

the virtual processor in the VM also has the Intel x86 architecture;

the virtual processor has a plurality of processing states at a plurality of current privilege levels (CPL), an input/output privilege level, and means for disabling interrupts;

the decision means is further provided for directing the VMM to activate the binary translation sub-system whenever at least one of the following conditions occur:

a) the CPL of the virtual processor is set to a most privileged level; b) the input/output privilege level of the virtual processor is greater than zero; and c) interrupts are disabled in the virtual processor;

the VMM, by means of the binary translation sub-system, thereby virtualizing all non-virtualizeable instructions of the virtual processor as a predetermined function of the processing state of the virtual processor.

12. A system as in claim 7, in which the the hardware processor has an Intel x86 architecture with a protected operation mode, a real operation mode, and a system management operation mode;

the VMM operates within the protected operation mode; and the decision means is further provided for directing the VMM to activate the binary translation sub-system whenever the real and system management operation modes of the processor are to be virtualized.

13. A system as in claim 8, in which:

the hardware processor has an Intel x86 architecture with a strictly virtualizeable virtual 8086 mode; and the decision means is further provided for directing the VMM to activate the direct execution sub-system whenever the virtual 8086 mode of the processor is to be virtualized.

14. A system as in claim 3, in which the computer has a plurality of hardware processors.

15. A system as in claim 14, further comprising:

a plurality of virtual processors included in the virtual machine; and in the VMM, VMM descriptor tables for each virtual processor;

the segment tracking means including means for indicating to the VMM, on selected ones of the plurality of hardware processors, any lack of correspondence between the shadow descriptor tables and their corresponding VM descriptor tables;

for each hardware processor on which the VMM is running, the decision means discriminating between the directly executable and the non-directly executable VM instructions independent of the remaining hardware processors.

16. A system for virtualizing a computer comprising:

a hardware processor;

a memory;

a virtual machine monitor (VMM) that has at least one virtual processor; and a virtual machine (VM) operatively connected to the virtual machine monitor for running a sequence of VM instructions, the VM instructions including directly executable VM instructions and non-directly executable instructions;

in which:

the virtual machine monitor includes:

a binary translation sub-system;

a direct execution sub-system; and an execution decision sub-system forming decision means for discriminating between the directly executable and non-directly executable VM instructions, and for selectively directing the VMM to activate the direct execution subsystem for execution by the hardware processor of the directly executable VM instructions and to activate the binary translation subsystem for execution on the hardware processor of the non-directly executable VM instructions;

the hardware processor has:

a plurality of privilege levels; and virtualizeable instructions and non-virtualizeable instructions, in which the non-virtualizeable instructions have predefined semantics that depend on the privilege level, in which the semantics of at least two of the privilege levels are non-trapping;

the virtual machine (VM) has a privileged operation mode and a non-privileged operation mode;

the decision means is further provided for directing the VMM to activate the binary translation sub-system when the VM is in the privileged operation mode;

the hardware processor has a plurality of hardware segments and at least one hardware segment descriptor table that is stored in the memory and that has, as entries, hardware processor descriptors;

the virtual machine (VM) has VM descriptor tables having, as entries, VM segment descriptors;

the VMM further includes:

VMM descriptor tables, including shadow descriptors, corresponding to predetermined ones of the VM descriptors tables; and segment tracking means for comparing the shadow descriptors with their corresponding VM segment descriptors, for indicating any lack of correspondence between shadow descriptor tables with their corresponding VM descriptor tables; and for updating the shadow descriptors to correspond to their respective corresponding VM segment descriptors;

one cached entry in the VMM descriptor tables for each segment of the processor, the binary translation sub-system selectively accessing each cached entry instead of the corresponding shadow entry;

the hardware processor includes detection means for detecting attempts by the VM to load VMM descriptors other than shadow descriptors, and means for updating the VMM descriptor table so that the cached entry corresponding to the processor segment also corresponds to the VM segment descriptor, and means for activating the binary translation subsystem, the binary translation sub-system using this cached entry until the processor segment is subsequently loaded with a VMM descriptor that is a shadow descriptor;

the hardware processor has predetermined caching semantics and includes non-reversible state information;

the segment tracking means is further provided for detecting attempts by the VM to modify any VM segment descriptor that leads to a non-reversible processor segment;

the VMM includes means for updating the VMM descriptor table so that the cached entry corresponding to the processor segment also corresponds to the VM segment descriptor, before any modification of the VM segment descriptor;

the decision means is further provided for directing the VMM to activate the binary translation sub-system when the segment-tracking means has detected creation of a non-reversible segment, the binary translation sub-system using the cached entry until the processor segment is subsequently loaded with a VMM descriptor that is a shadow descriptor;

the hardware processor has a native mode and non-native execution modes, in which at least one of the non-native execution modes is strictly virtualizeable;

the virtual processor has native and non-native execution modes, in which the non-native execution modes are independent of the VM descriptor tables for accessing segments;

the decision means is further provided for directing the VMM to operate using the cached descriptors and to activate the binary translation sub-system when the hardware processor is in the non-native execution mode, the binary translation sub-system using the cached entry in the native mode when at least one of the following conditions is present: the virtual processor is in one of the non-native execution modes; and at least one virtual processor segment has been most recently loaded in one of the non-native execution modes;

the decision means is further provided for directing the VMM to activate the direct execution sub-system when the hardware processor is in any strictly virtualizeable execution mode;

the hardware processor has a memory management unit (MMU);

the VMM includes memory tracing means included in the VMM for detecting, via the MMU, accesses to selectable memory portions; and the segment tracking means is operatively connected to the memory tracing means for detecting accesses to selected memory portions.

17. In a system that includes:
a computer with a hardware processor and a memory;
a virtual machine monitor (VMM); and
at least one virtual machine (VM) that has a at least one virtual processor and is operatively connected to the VMM for running a sequence of VM instructions, the VM instructions including directly executable VM instructions and non-directly executable instructions;

a method comprising the following steps:
in the VMM, executing the directly executable VM instructions using direct execution and executing the non-directly executable instructions using binary translation.

18. A method as in claim 17, further comprising the following steps:
in the VMM, executing the VM instructions using binary translation when the VM is in a privileged operation mode; and
the privileged and non-privileged operation modes of the VM being a predefined function of privilege levels of the hardware processor and predetermined semantics of the privilege levels of the hardware processor, of which the semantics of at least two of the privilege levels are mutually different and non-trapping.

19. A method as in claim 17, further comprising the following steps:
comparing VMM shadow descriptors with corresponding VM segment descriptors, indicating any lack of correspondence between VMM shadow descriptor tables and corresponding VM descriptor tables, and updating the shadow descriptors to correspond to their respective corresponding VM segment descriptors.

20. A method as in claim 19, further comprising the following steps:
in the VMM, storing, for each of a plurality of hardware processor segments, a cached descriptor in a descriptor cache; and
executing VM instructions using binary translation and selectively accessing each cached entry instead of the corresponding shadow entry.

21. A method as in claim 20, further comprising the following steps:
detecting attempts by the VM to load VMM descriptors other than shadow descriptors;
updating the VMM descriptor table so that the cached entry corresponding to the processor segment also corresponds to the VM segment descriptor; and
executing VM instructions using binary translation and using the cached entry until the processor segment is subsequently loaded with a VMM descriptor that is a shadow descriptor.

22. A method as in claim 20, further comprising the following steps:
detecting attempts by the VM to modify any VM segment descriptor that leads to a non-reversible processor segment;
updating the VMM descriptor table so that the cached entry corresponding to the processor segment also corresponds to the VM segment descriptor, before any modification of the VM segment descriptor;
detected creation of any non-reversible segment;
executing VM instructions using binary translation when creation of any non-reversible segment is detected and using the cached entry until the processor segment is subsequently loaded with a VMM descriptor that is a shadow descriptor.

23. A method as in claim 20, further comprising the following steps:
when the hardware processor is in any one of a plurality of non-native execution modes, operating the VMM using the cached descriptors and executing VM instructions by binary translation, using the cached entry in the native mode, when at least one of the following conditions is present: the virtual processor is in one of the non-native execution modes; and at least one virtual processor segment has been most recently loaded in one of the non-native execution modes.

24. A method as in claim 23, in which the non-native execution modes of the hardware processor, which has an Intel x86 architecture, include a protected operation mode, a real operation mode, and a system management operation mode, further comprising the following steps:

operating the VMM within the protected operation mode; and executing VM instructions by binary translation whenever the real and system management operation modes of the processor are to be virtualized.

25. A method as in claim 20, in which at least one of the non-native execution modes is strictly virtualizeable, further including the step of executing VM instructions by binary translation when the hardware processor is in any strictly virtualizeable execution mode.

26. A method as in claim 25, in which the hardware processor has an Intel x86 architecture with a strictly virtualizeable virtual 8086 mode, further comprising the step of executing VM instructions using direct execution whenever virtual 8086 mode of the processor is to be virtualized.

27. A method as in claim 19, further comprising the step of applying memory tracing in the VMM and thereby detecting, via a MMU in the hardware processor, accesses to selectable memory portions.

28. A method as in claim 17, further including the step of executing VM instructions by binary translation whenever at least one of the following conditions occurs:

a) a current privilege level (CPL) of the virtual processor is set to a most privileged level; b) an input/output privilege level of the virtual processor is greater than zero; and c) interrupts are disabled in the virtual processor;

whereby all non-virtualizeable instructions of the virtual processor are virtualized as a predetermined function of a processing state of the virtual processor.

* * * * *

UNITED STATES PATENT AND TRADEMARK OFFICE
CERTIFICATE OF CORRECTION

PATENT NO. : 6,397,242 B1 Page 1 of 1
APPLICATION NO. : 09/179137
DATED : May 28, 2002
INVENTOR(S) : Scott W. Devine et al.

It is certified that error appears in the above-identified patent and that said Letters Patent is hereby corrected as shown below:

Title page item (73) Assignee, change

"VMWare, Inc., Palo Alto, CA (US)"

to

--VMware, Inc., Palo Alto, CA (US)--

Signed and Sealed this

Seventh Day of July, 2009

JOHN DOLL
*Acting Director of the United States Patent and Trademark Office*